(12) United States Patent
Tajima et al.

(10) Patent No.: US 8,356,154 B2
(45) Date of Patent: *Jan. 15, 2013

(54) STORAGE SYSTEM, DATA RELOCATION METHOD THEREOF, AND RECORDING MEDIUM THAT RECORDS DATA RELOCATION PROGRAM

(75) Inventors: Sachie Tajima, Kawasaki (JP); Ryoichi Ueda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 55 days.

This patent is subject to a terminal disclaimer.

(21) Appl. No.: 12/967,183

(22) Filed: Dec. 14, 2010

(65) Prior Publication Data

US 2011/0202741 A1 Aug. 18, 2011

Related U.S. Application Data

(63) Continuation of application No. 11/744,907, filed on May 7, 2007, now Pat. No. 7,853,770.

(30) Foreign Application Priority Data

Sep. 1, 2006 (JP) ................................ 2006-237626

(51) Int. Cl.
G06F 12/00 (2006.01)
(52) U.S. Cl. ........................................ 711/165; 711/167
(58) Field of Classification Search .................. 711/165, 711/167
See application file for complete search history.

(56) References Cited

U.S. PATENT DOCUMENTS

| | | | |
|---|---|---|---|
| 5,893,139 A | 4/1999 | Kamiyama | |
| 6,032,224 A | 2/2000 | Blumenau | |
| 6,640,285 B1 | 10/2003 | Bopardikar et al. | |
| 6,691,136 B2 | 2/2004 | Lee et al. | |
| 6,785,767 B2 | 8/2004 | Coulson | |
| 6,842,876 B2 | 1/2005 | Schilit et al. | |
| 6,948,042 B2 | 9/2005 | Nagase et al. | |
| 7,356,660 B2 | 4/2008 | Matsunami et al. | |
| 7,506,012 B2 | 3/2009 | Nishikawa et al. | |
| 2005/0273638 A1 | 12/2005 | Kaiju et al. | |

FOREIGN PATENT DOCUMENTS

| | | |
|---|---|---|
| JP | 05-012077 | 1/1993 |
| JP | 08-263335 | 10/1996 |
| JP | 9-282201 | 10/1997 |

*Primary Examiner* — Matthew Bradley

(74) *Attorney, Agent, or Firm* — Antonelli, Terry, Stout & Kraus, LLP.

(57) ABSTRACT

There is a need to improve access speed for a file in a storage system that is provided with multiple storage units having different access speeds.

The storage system (10) includes an access frequency acquiring part (14) that divides a past constant accessed data acquisition period into multiple unit periods, and obtains an access frequency for file stored in any of the multiple storage units (30 and 31), a similarity degree calculating part (16) that obtains, for each file, a similarity degree between the access frequency to the file for each unit period, and the access frequency to every other file for each unit period, a grouping process part (17) that groups one or more other files having a similarity degree equal to or higher than a predetermined value, in an identical group, and a file relocation part (18) that places a file belonging to the identical group into a storage unit (30) having a high access speed, when the file stored in the storage units (30 and 31) is accessed and there exists any other file within the identical group to which the file belongs.

15 Claims, 13 Drawing Sheets

FIG. 2

FILE INFORMATION TABLE (21)

| FILE ID | FILE PATH |
|---|---|
| 1 | /fruit/apple.jpg |
| 2 | /meal/bread.html |
| 3 | /fruit/cherry.ppt |
| 4 | /dish.doc |
| 5 | /meal/egg.txt |
| 6 | /fruit/fig.ppt |
| 7 | /sweets/gum.xls |
| 8 | /herb.html |
| 9 | /ice.txt |
| 10 | /sweets/jelly.ppt |

ACCESS DATE & TIME TABLE (22)

| FILE ID | ACCESS DATE & TIME |
|---|---|
| 5 | 2005/10/01 09:12:10 |
| 7 | 2005/10/01 09:41:02 |
| 7 | 2005/10/01 10:33:41 |
| 10 | 2005/10/01 10:49:30 |
| 2 | 2005/10/01 11:18:56 |
| 3 | 2005/10/01 13:01:44 |
| 7 | 2005/10/01 13:04:46 |
| 10 | 2005/10/01 14:15:58 |
| 10 | 2005/10/01 15:38:11 |
| 10 | 2005/10/01 17:55:32 |
| 7 | 2005/10/01 20:00:29 |
| 10 | 2005/10/01 20:38:17 |
| 5 | 2005/10/02 09:08:52 |
| 10 | 2005/10/02 09:14:15 |

ACCESS FREQUENCY TABLE (23)

| FILE ID | 2005/10/1 | 2005/10/2 | 2005/10/3 | 2005/10/4 | 2005/10/5 | 2005/10/6 | 2005/10/7 | TOTAL |
|---|---|---|---|---|---|---|---|---|
| 1 | 0 | 0 | 3 | 5 | 2 | 1 | 0 | 11 |
| 2 | 1 | 2 | 1 | 0 | 0 | 0 | 0 | 4 |
| 3 | 1 | 0 | 0 | 3 | 2 | 0 | 0 | 6 |
| 4 | 0 | 0 | 0 | 0 | 2 | 4 | 2 | 8 |
| 5 | 1 | 1 | 1 | 1 | 1 | 1 | 1 | 7 |
| 6 | 0 | 0 | 0 | 0 | 0 | 0 | 0 | 0 |
| 7 | 4 | 3 | 0 | 0 | 0 | 0 | 0 | 7 |
| 8 | 0 | 0 | 0 | 1 | 0 | 3 | 3 | 7 |
| 9 | 0 | 0 | 0 | 0 | 1 | 3 | 2 | 6 |
| 10 | 5 | 4 | 3 | 1 | 0 | 0 | 0 | 13 |

CALIBRATED ACCESS DEGREE TABLE (24)

| FILE ID | 2005/10/1 | 2005/10/2 | 2005/10/3 | 2005/10/4 | 2005/10/5 | 2005/10/6 | 2005/10/7 |
|---|---|---|---|---|---|---|---|
| 1 | 0 | 0 | 0.68 | 0.91 | 0.36 | 0.18 | 0 |
| 2 | 0.50 | 1.25 | 0.63 | 0 | 0 | 0 | 0 |
| 3 | 0.33 | 0 | 0 | 1.00 | 0.67 | 0 | 0 |
| 4 | 0 | 0 | 0 | 0 | 0.50 | 1.00 | 0.63 |
| 5 | 0.29 | 0.36 | 0.36 | 0.29 | 0.29 | 0.29 | 0.36 |
| 6 | 0 | 0 | 0 | 0 | 0 | 0 | 0 |
| 7 | 1.14 | 1.07 | 0 | 0 | 0 | 0 | 0 |
| 8 | 0 | 0 | 0 | 0.29 | 0 | 0.86 | 1.07 |
| 9 | 0 | 0 | 0 | 0 | 0.33 | 1.00 | 0.83 |
| 10 | 0.77 | 0.77 | 0.58 | 0.15 | 0 | 0 | 0 |

FILE SIMILARITY DEGREE TABLE (25)

| FILE ID | 1 | 2 | 3 | 4 | 5 | 6 | 7 | 8 | 9 | 10 |
|---|---|---|---|---|---|---|---|---|---|---|
| 1 | | 0.43 | 1.15 | 0.36 | 0.66 | 0 | 0 | 0.42 | 0.30 | 0.53 |
| 2 | | | 0.17 | 0 | 0.81 | 0 | 1.91 | 0 | 0 | 1.71 |
| 3 | | | | 0.33 | 0.57 | 0 | 0.38 | 0.29 | 0.22 | 0.41 |
| 4 | | | | | 0.65 | 0 | 0 | 1.53 | 1.69 | 0 |
| 5 | | | | | | 0 | 0.71 | 0.71 | 0.68 | 0.74 |
| 6 | | | | | | | 0 | 0 | 0 | 0 |
| 7 | | | | | | | | 0 | 0 | 1.70 |
| 8 | | | | | | | | | 1.75 | 0.04 |
| 9 | | | | | | | | | | 0 |
| 10 | | | | | | | | | | |

FILE GROUP TABLE (26)

| FILE ID | FILE ID INCLUDED IN IDENTICAL GROUP |
|---|---|
| 1 | 3 |
| 2 | 7,10 |
| 3 | 1 |
| 4 | 8,9 |
| 5 | — |
| 6 | — |
| 7 | 2,10 |
| 8 | 4,9 |
| 9 | 4,8 |
| 10 | 2,7 |

FILE SIMILARITY DEGREE TABLE

| FILE ID | 1 | 2 | 3 | 4 | 5 | 6 | 7 | 8 | 9 | 10 |
|---|---|---|---|---|---|---|---|---|---|---|
| 1 |  | 3 | <u>19</u> | 8 | 11 | 0 | 0 | 8 | 5 | 14 |
| 2 |  |  | 1 | 0 | 4 | 0 | <u>16</u> | 0 | 0 | <u>16</u> |
| 3 |  |  |  | 4 | 6 | 0 | 4 | 3 | 2 | 8 |
| 4 |  |  |  |  | 8 | 0 | 0 | <u>18</u> | <u>18</u> | 0 |
| 5 |  |  |  |  |  | 0 | 7 | 7 | 6 | 13 |
| 6 |  |  |  |  |  |  | 0 | 0 | 0 | 0 |
| 7 |  |  |  |  |  |  |  | 0 | 0 | <u>32</u> |
| 8 |  |  |  |  |  |  |  |  | <u>15</u> | 1 |
| 9 |  |  |  |  |  |  |  |  |  | 0 |
| 10 |  |  |  |  |  |  |  |  |  |  |

STORAGE SYSTEM, DATA RELOCATION METHOD THEREOF, AND RECORDING MEDIUM THAT RECORDS DATA RELOCATION PROGRAM

CROSS REFERENCE TO RELATED APPLICATION

This is a continuation of U.S. application Ser. No. 11/744, 907, filed May 7, 2007 (now U.S Pat. No. 7,853,770). This application relates to and claims priority from Japanese Patent Application No. 2006-237626, filed on Sep. 1, 2006. The entirety of the contents and subject matter of all of the above is incorporated herein by reference.

FIELD OF THE INVENTION

The present invention relates to a storage system that is provided with multiple storage units having different access speeds, a data relocation method thereof, and a data relocation program.

BACKGROUND OF THE INVENTION

In recent years, data volume handled by computers is dramatically increasing, and there is a growing need for a high-capacity storage system.

As a high-capacity storage system, there is a hierarchical storage system that combines a high-speed low-capacity storage unit having short required access time, but low capacity, and a low-speed high-capacity storage unit having long required access time but with high capacity. In this hierarchical storage system, an appropriate data arrangement is significant, placing highly accessed data in the high-speed, low-capacity storage unit, and infrequently accessed data in the low-speed, high-capacity storage unit, so that a user's time required for accessing can be reduced.

Considering the above discussed point, Japanese Patent Laid-open Publication No. H05-12077 (hereinafter, referred to as "Patent Document 1"), for instance, discloses the following technique.

Patent Document 1 discloses a technique that obtains access frequency based on an access history of data that is stored in multiple storage units each having different performance and capacity, and places frequently accessed data into a storage unit having a high accessing speed, and infrequently accessed data into a storage unit having a low accessing speed.

However, in this technique, there is a problem in that when a particular data item is accessed, there is a high probability that other data item having relevance to this particular data is accessed. Even when the particular data item is accessed, if this other data item is accessed only infrequently, it takes a long time for accessing, since the other data item is placed in a low-speed storage unit.

In order to solve the above problem, Japanese Patent Laid-open Publication No. H08-263335 (hereinafter, referred to as "Patent Document 2") discloses a technique as follows: When the other data item is accessed within a certain period of time after the particular data item is accessed, it is assumed that the particular data item and the other data item are belonging to an identical group, and when any of the data within the group is accessed, the other data within the group are placed in the high-speed storage unit.

SUMMARY OF THE INVENTION

The technique disclosed by Patent Document 2 is assuredly able to solve the technical problems included in the art described in Patent Document 1. However, there are further problems such as the following: For example, if just after accessing a particular data item, other data item that has no relevance to this particular data is accidentally accessed, this other data item is treated as though it belongs to an identical group; and even though a data item having a high relevance to this particular data exists, this data item is not treated as belonging to the identical group, if this data is not accessed after the particular data is accessed, just before placement of data. Due to these problems, appropriate grouping is not performed, resulting in the time for accessing data being long.

In view of such problems of the conventional art as described above, an object of the present invention is to provide a storage system that optimizes grouping of data and reduces time for accessing data, a data relocation method thereof, and a data relocation program.

The data relocation method to solve the problems above, in a storage system provided with multiple storage units each having a different access speed, executes, an access frequency acquiring process that divides a past constant accessed data acquisition period into multiple unit periods, and obtains an access frequency as to each data item stored in any of the multiple storage units, a similarity degree calculating process that obtains similarity degrees between an access frequency for each unit period of a particular data item among each of the data items and the access frequency for each unit period of every other data item, a grouping process that groups the particular data item and one or more other data items in an identical group, one or more other data items having the similarity degree equal to or higher than a predetermined value with regard to the particular data item, and a data placing process that places one or more data items belonging to the identical group into a storage unit having a high access speed among the multiple storage units, when the particular data item is accessed and there exists any data item within the identical group to which the particular data item belongs.

Here, the similarity degree calculating process may obtain the similarity degree between the data item and every other data item, with respect to each data item, the grouping process may group one or more other data items whose similarity degree are equal to or higher than a predetermined value, in the identical group, with respect to each data item, and when any among each of the data items is accessed, the data placing process may place the data item belonging to the identical group into the storage unit having the high access speed, if the identical group includes any data item.

Furthermore, when any of each data item is accessed, this data item may be assumed to be the particular data item.

In order to solve the problems as described above, a computer readable data relocation program, that is recorded in a recording medium, is a data relocation program of a storage system provided with multiple storage units having different access speeds, allows a computer to execute, an access frequency acquisition step that divides a past constant accessed data acquisition period, into multiple unit periods, and obtains an access frequency as to each data item stored in any of the multiple storage units, a similarity degree calculating step that obtains similarity degrees between an access frequency for each unit period of a particular data item among each of the data items, and the access frequency for each unit period of every other data item, a grouping step that groups the particular data item and one or more other data items in an identical group, one or more other data items having the similarity degree equal to or higher than a predetermined value with regard to the particular data item, and a data placing step that places one or more data items belonging to the identical group into a storage unit having a high access speed among the multiple storage units, when the particular data item is accessed and there exists any data item within the identical group to which the particular data item belongs.

The storage system to solve the problems as described above is provided with multiple storage units having different access speeds, and a computer, and the aforementioned program is installed in the computer.

In the present invention, if a particular data item is accessed and other data item having a high accessing relevancy to this particular data item exists, this other data is placed in a high-speed storage unit even though the access frequency of the other data is low. Therefore, it is possible to reduce the access time. Further in the present invention, an access frequency for each data item for each unit period within the accessed data acquisition period is obtained, and a similarity degree between the access frequency of the particular data item for each unit period, and the access frequency of the other data item for each unit period is also obtained. Therefore, it is possible to group the data so that the data is not affected by chance. Therefore, also from this point of view, the access time can be reduced. For instance, in the present invention, even though other data item having no relevancy to a particular data item is accidentally accessed after the particular data item is accessed, it is possible to avoid treating this other data as belonging to an identical group. Furthermore, when there is other data item having high relevancy to the particular data, and even though this other data is not accessed just before placing the data, after the particular data is accessed, it is possible to treat this other data as belonging to the identical group. In particular, the present invention introduces the concept of degree of grouping, and eliminates chance as far as possible in the course of obtaining the similarity degree as an index for grouping. Therefore, very relevant grouping can be performed.

BRIEF DESCRIPTION OF THE DRAWINGS

FIG. 2 is an illustration showing a data structure of a file information table as the first embodiment of the present invention;

FIG. 3 is an illustration showing a data structure of an access date and time table as the first embodiment of the present invention;

FIG. 4 is an illustration showing a data structure of an access frequency table as the first embodiment of the present invention;

FIG. 5 is an illustration showing a data structure of a calibrated access degree table as the first embodiment of the present invention;

FIG. 6 is an illustration showing a data structure of a file similarity degree table as the first embodiment of the present invention;

FIG. 7 is an illustration showing a data structure of a file group table as the first embodiment of the present invention;

FIG. 13 is an illustration showing a data structure of the file similarity degree table as a modification of the present invention.

DESCRIPTION OF THE PREFERRED EMBODIMENTS

Hereinafter, various embodiments of the storage system relating to the present invention will be explained with reference to the accompanying drawings.

First Embodiment

The first embodiment of the storage system relating to the present invention will be explained with reference to FIG. 1 to FIG. 10.

Figure 1:
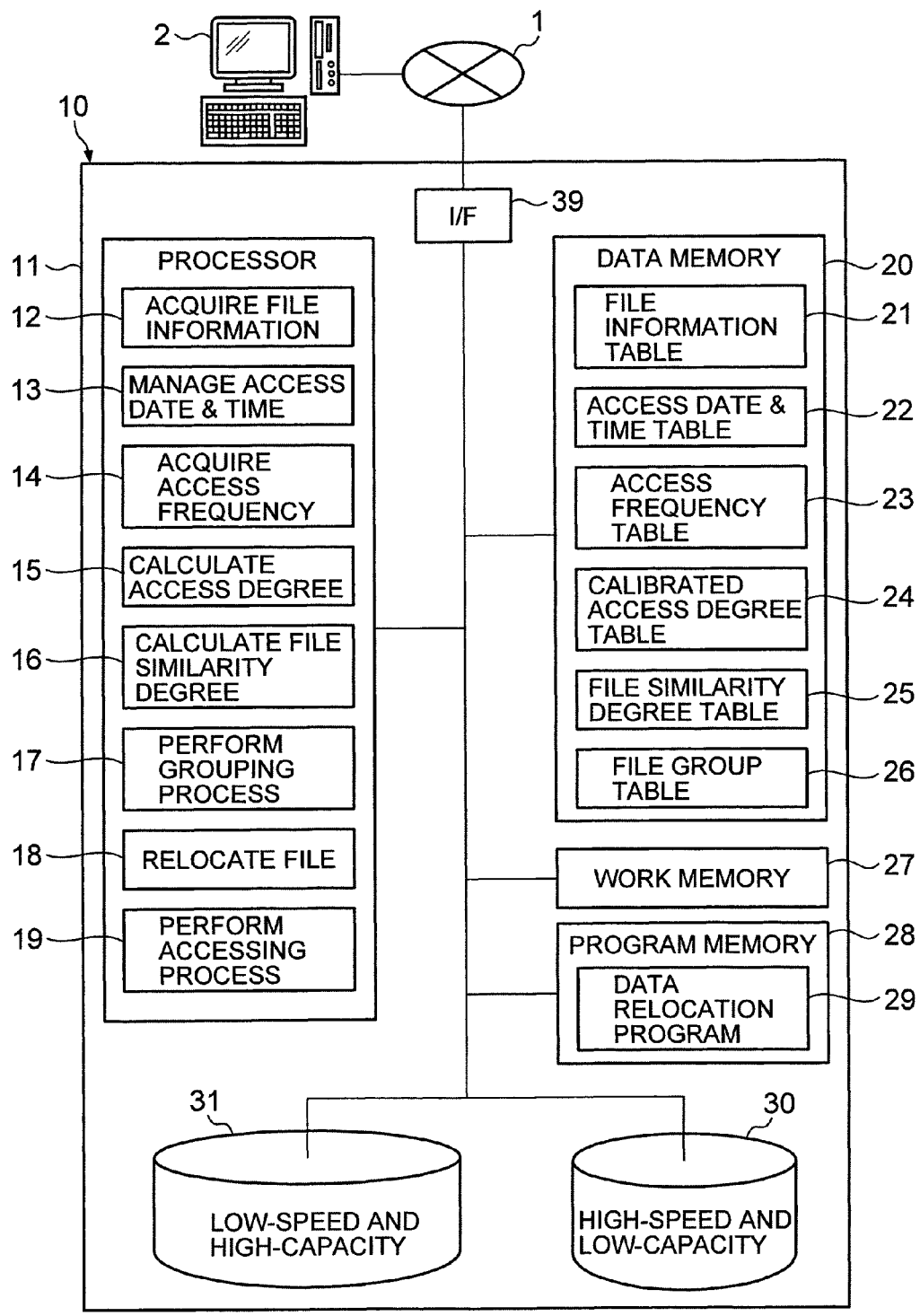
FIG. 1 is a block diagram showing a storage system as a first embodiment of the present invention.

As shown in FIG. 1, the storage system 10 of the present embodiment is provided with a processor 11 that executes various arithmetic processing, a data memory 20 that stores data obtained by the arithmetic processing performed by the processor 11, a work memory 27 that is used in the arithmetic processing performed by the processor 11, a program memory 28 that stores various programs, a high-speed low-capacity storage unit 30, a low-speed high-capacity storage unit 31, and an interface 39 that establishes communication with a network 1. This storage system 10 is connected to a client terminal 2 via the network 1.

The processor 11 in the storage system 10 includes, as its functions, a file information acquisition part 12 that acquires information of a file stored in each of the storage units 30 and 31, an access date and time management part 13 that manages the date and time when the file stored in each of the storage units 30 and 31 is accessed, an access frequency calculation part 14 that obtains an access frequency to the file during a past period for acquiring accessed data, an access degree calculation part 15 that obtains a file access degree as described below, a file similarity degree calculation part 16 that obtains a similarity degree between the access degree of one file and the access degree of every other file with respect to each file, a grouping process part 17 that categorizes, into one group, multiple files having a high degree of similarity with one another, a file relocation part 18 that places, when one file in the group is accessed, the other file within an identical group into the high-speed low-capacity storage unit 30, and an access processing part 19 that performs access processing for the files stored in each of the storage units 30 and 31.

The program memory 28 stores various programs including the data relocation program 29 that the processor 11 executes. The data relocation program 29 is a program to implement, as functions of the processor 11, the access frequency calculation part 14, the access degree calculation part 15, the file similarity degree calculation part 16, the grouping process part 17, and the file relocation part 18.

The data memory 20 is provided with a file information table 21 that stores information of a file, which is acquired by the file information acquisition part 12, an access date and time table 22 that stores access date and time when the file is accessed, which is acquired by the access date and time managing part 13, an access frequency table 23 that stores an access frequency with respect to each file, which is obtained by the access frequency calculation part 14, a calibrated access degree table 24 that stores a calibrated access degree described below, which is obtained by the access degree calculation part 15, a file similarity degree table 25 that stores a similarity degree with respect to each file, which is obtained by the file similarity degree calculation part 16, and a file group table 26 that stores a file ID with respect to each group.

In the present embodiment, it is assumed that the storage system 10 includes each of the storage units 30 and 31 together with the processor 11 and the like, in the same enclosure. However, they are not necessarily accommodated in the same enclosure. In addition, in the present embodiment, the storage system 10 and the client terminal 2 are individual devices. However, there is no problem if the client terminal 2 contains the storage system 10, or the storage system 10 contains the client terminal 2. Here, the high-speed storage unit 30 has a low capacity and the low-speed storage unit 31 has a high capacity. However, the capacity size, low or high, does not directly relate to the present invention, and the present invention is applicable as long as there are multiple storage units each having a different access speed.

As mentioned above, the file information table 21 is a table that stores information of each file acquired by the file information acquisition part 12. As shown in FIG. 2, this file information table 21 includes a file ID field 21*a* where a file ID is stored, and a file path field 21*b* where a path to specify a location of a file with respect to each file ID is stored. By way of example, in the file ID field 21*a*, a file ID "1" is stored, and in the file path field 21*b* "/fruit/apple.jpg" is stored as a file path corresponding to the file ID "1". The file information stored in this file information table 21 is continually kept up to date by the file information acquisition part 12.

The access date and time table 22 is a table that stores a date and time when each of the files is accessed, which is acquired by the access date and time managing part 13. As shown in FIG. 3, the access date and time table 22 includes an access date and time field 22*b* which stores the date and time when the file is accessed, and a file ID field 22*a* in which a file ID of the file that has been accessed is stored. For example, if a file having the file ID "5" is accessed at "2005/10/01 09:12:10", "5" is stored in the file ID field 22*a*, and "2005/10/01 09:12:10" is stored in the access date and time field 22*b*. In this example here, only the date and time relating to accessing are stored. However, it is further possible to store attribute information such as indicating whether the access is a write access or a read access. This access date and time table 22 is updated by the access date and time managing part 13, every time the access processing part 19 accesses a file.

The access frequency table 23 is a table that stores the number of times of access, i.e., access frequency, with respect to each file during the accessed data acquisition period, which is obtained by the access frequency calculation part 14. The accessed data acquisition period is a period necessary for data relocation described below, and it is predetermined by a user. Here, as shown in FIG. 4, the accessed data acquisition period is assumed as being one week from 2005/10/1 to 2005/10/7 (i.e., Oct. 1 to 7, 2005). This accessed data acquisition period may be divided into multiple unit periods, which are predetermined by the user. In this particular example, this unit period is one day. The access frequency table 23 includes a file ID field 23*a* to store a file ID of each file stored in each of the storage units 30 and 31, an access frequency field 23*b* to store the access frequency for each unit period during the accessed data acquisition period, with respect to each file ID, and a total field 23*c* to store a total access frequency during the accessed data acquisition period with respect to each file ID. This particular example illustrates that "1" is stored in the file ID field 23*a* and the access frequency field 23*b* associated with this file ID "1" stores 0 times for "2005/10/1", 0 times for "10/2", three times for "10/3", five times for "10/4", two times for "10/5", one time for "10/6", and 0 times for "10/7". It is to be noted that in this example, the access frequency is stored without distinguishing between write access and read access. However, it is possible to differentiate the write access and the read access when each access frequency is stored.

The calibrated access degree table 24 is a table to store a calibrated access degree that is obtained by the access degree calculation part 15 by using the access frequency, for each unit period with respect to each file ID. Definitions of the calibrated access degree, the access degree to obtain the calibrated access degree, and a calculation method thereof will be described in detail below. Basically, both the access degree and the calibrated access degree are values indicating a degree of access frequency of the file during a unit period, relative to the total access frequency of the file during the accessed data acquisition period. Therefore, if the access degree or the calibrated access degree is high for a certain file during a constant unit period, this indicates that the number of times of access for this file is large during this unit period. This calibrated access degree table 24 includes a file ID field 24*a* to store the entire file IDs stored in the file ID field 23*a* of the access frequency table 23, and a calibrated access degree field 24*b* that stores a calibrated access degree for each unit period during the accessed data acquisition period with respect to each file ID. This particular example illustrates that "1" is stored in the file ID field 24*a*, and in the calibrated access degree fields 24*b* associated with this file ID "1", the calibrated access degrees are respectively stored, i.e., "0" for "2005/10/1", "0" for "2005/10/2", "0.68" for "10/3", "0.91" for "10/4", "0.36" for "10/5", "0.18" for "10/6", and "0" for "10/7".

The file similarity degree table 25 is a table where the file similarity degree calculation part 16 stores a similarity degree indicating a similarity degree between the access frequency for one file within the unit period and the access frequency for other files within the unit period, with respect to each file ID. Definitions of the similarity degree and a calculation method thereof will be described in detail below. The higher the value is, the higher the possibility is that the two files are accessed within an identical unit period. The file similarity degree table 25 includes a file ID field 25*a* to store all the file IDs stored in the file ID field 23*a* of the access frequency table 23, and a similarity degree field 25*b* that stores a similarity degree relative to another file, with respect to each file ID and the other file ID. This particular example illustrates that "1" is stored in the file ID field 25*a*, and, in the similarity degree fields 25*b* associated with the file ID "1", the similarity degrees are respectively stored, i.e., a similarity degree "0.43" for a file having a file ID "2", a similarity degree "1.15" for a file having a file ID "3", a similarity degree "0.36" for a file having a file ID "4", a similarity degree "0.66" for a file having a file ID "5", a similarity degree "0" for a file having a file ID "6", a similarity degree "0" for a file having a file ID "7", a similarity degree "0.42" for a file having a file ID "8", a similarity degree "0.30" for a file having a file ID "9", and a similarity degree "0.53" for a file having a file ID "10".

The file group table 26 is a table where the grouping process part 17 stores, with respect to each file ID, a second file ID that is assumed as belonging to a group that is the same as the file having the file ID. The group processing method will be described below. As shown in FIG. 7, the file group table 26 includes a file ID field 26*a* storing all the file IDs stored in the file ID field 23*a* of the access frequency table 23, and a field 26*b* of file IDs included in the same group storing a file ID belonging to the same group as the file, for each file ID. This particular example illustrates that "1" is stored in the file ID field 26*a*, and "3" is stored in the field of file IDs included in the same group 26*b*, which is associated with the filed ID "1". In other words, this example indicates that the file having the file ID "1" and the file having the file ID "3" belong to the same group. Therefore, "3" is stored in the file ID field 26a, and, clearly, "1" is stored in the associated field of file IDs included in the same group 26b. However, this is not the case if this grouping is performed while distinguishing between reading access and writing access, as described below.

Next, with reference to the flowchart shown in FIG. 8, operations of the storage system 10 according to the present embodiment will be explained.

Firstly, the access frequency calculation part 14 determines whether or not the latest unit period is finished (S10). If the latest unit period is not finished yet, that is, it is still within the unit period, the process in step 80 is carried out. If the latest unit period is already finished, the access frequency calculation part 14 sets a new unit period and a new accessed data acquisition period (S20).

By way of example, if the current date is Oct. 7, 2005, the accessed data acquisition period at this date is one week, from Sep. 30, 2005 to Oct. 6, 2005. In the case above, the access frequency calculation part 14 determines that the latest unit period is October 7 and determines whether or not this day is finished (S10). If this day is finished, the access frequency calculation part 14 sets this day, i.e., October 7, as a new unit period of the accessed data acquisition period, as well as changing the setting of the accessed data acquisition period to one week, from the Oct. 1, 2005 to Oct. 7, 2005. According to this change of settings, the access frequency calculation part 14 renews the date of each unit period in the access frequency table 23 (FIG. 4). In the example here, it is assumed that the accessed data acquisition period is one week and the unit period is one day. However, the present invention is not limited to these settings. In addition, in the example here, it is assumed that the new accessed data acquisition period is the most recent one week. However, a user may decide, as appropriate, a start time and an end time of the new accessed data acquisition period. Therefore, depending on the settings by the user, the unit period need not necessarily be the latest, in deciding whether or not the unit period of step 10 is finished.

Subsequently, the access frequency calculation part 14 refers to the access date and time table 22 and obtains the access frequency of each file with respect to each unit period within the accessed data acquisition period, and stores this access frequency in the access frequency table 23 (S30). In this example here, the access frequency calculation part 14 obtains only the access frequency during a unit period newly set in step 20, and as for the other unit periods during the accessed data acquisition period, the data during the unit period already calculated is used as it is. Consequently, as shown in FIG. 4, the access frequency table 23 stores a frequency of each file with respect to each unit period during the accessed data acquisition period corresponding to one week from Oct. 1, 2005 to Oct. 7, 2005.

When the access frequency table 23 is updated by the access frequency calculation part 14, the access degree calculation part 15 obtains a calibrated access degree, and stores this value in the calibrated access degree table 24 (S40).

Figure 9:
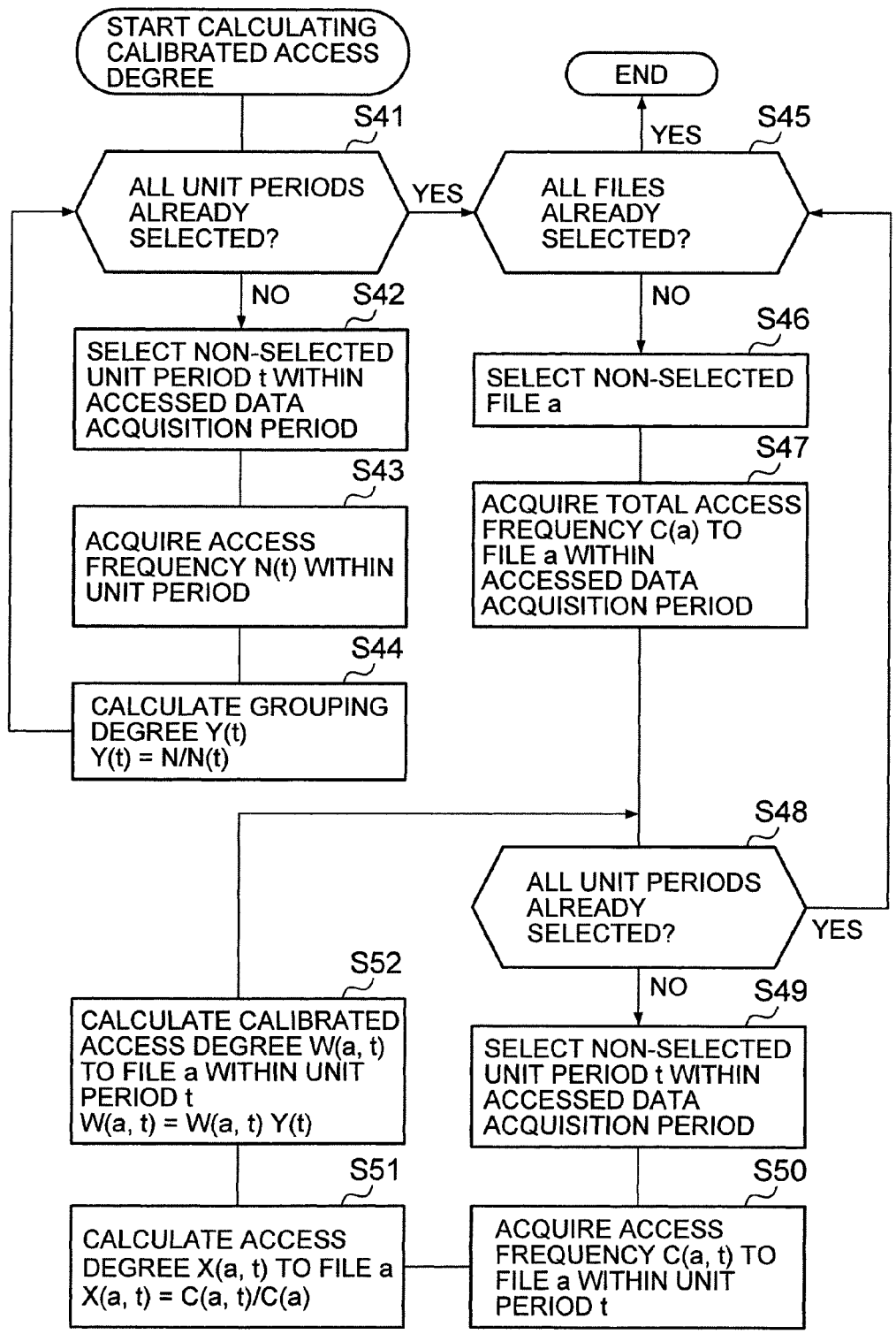
FIG. 9 is a flowchart showing details of the process for calculating the calibrated access degree that is shown in FIG. 8.

Here, with reference to the flowchart as shown in FIG. 9, details of the calibrated access degree calculation process (S40) will be explained, which is performed by the access degree calculation part 15.

The access degree calculation part 15 firstly determines whether or not the all the unit periods set in the access frequency table 23 are selected (S41). If all the unit periods are selected, the processing continues to step 45. If the entire unit periods are not selected, a non-selected unit period t is selected (S42), and the access degree calculation part 15 obtains the number of files that have been accessed during the unit period t, in other words, access frequency N(t) of all the files (S43). Subsequently, a grouping degree Y(t) (=N/N(t)) is calculated, which is a ratio between the number of all the files N stored in the file information table, and the access frequency N(t) to all the files within the unit period t (S44). For example, the number of all the files N is 10 (ten) having the file IDs "1" to "10", and 5 (five) files are accessed during the unit period of October 1, which is the access frequency N (10/1) to all the files. Therefore, the grouping degree Y (10/1) of the unit period of October 1 is equal to two (=10/5). In addition, the grouping degree in the unit period of October 3 (10/3) is equal to 2.5 (=10/4). The grouping degree Y(t) is a value having a role of assigning weights to the access degree described below, and when the access frequency N(t) within the unit period t becomes larger, the value of the grouping degree Y(t) becomes smaller. The significance of the grouping degree will be explained later.

When the grouping degree Y(t) for a constant unit period t is calculated, the processing returns to step 41, and again it is determined whether or not all the unit periods have been selected. If all the unit periods are selected, it is determined whether or not all the files stored in the access frequency table 23 have been selected (S45). If all the files are selected, the process for calculating the calibrated access degree (S40) is terminated. If all the files have not been selected, file a, which has not been selected yet, is selected (S46). Then, the total access frequency C(a) to this file a during the accessed data acquisition period is obtained from the access frequency table 23 (S47). For example, the total access frequency C(1) to the file having the file ID "1" is "11" according to the access frequency table 23 (FIG. 4).

Subsequently, the access frequency calculation part 14 determines whether or not all the unit periods within the accessed data acquisition period have already been selected (S48), and if they have already been selected, the processing returns to step 45. Otherwise, the unit period t that has not been selected yet is selected (S49). Then, the access frequency C to the file a, during the unit period t(a, t), is obtained from the access frequency table 23 (S50). Thereafter, the access degree X(a, t) (=C(a, t)/C(a)) is obtained, which is a ratio of the access frequency C(a, t) to the file a during the unit period t, relative to the total access frequency C(a) to the file a during the accessed data acquisition period (S51). For example, C(1, 10/3) is "3", which is the access frequency to the file "1" during the unit period of October 3, according to the access frequency table 23 (FIG. 4). The total access frequency C(1) to the file "1" is "11" as described above. Therefore, X(1, 10/3) is 0.27 (=3/11), which is the access degree of the file "1" during the unit period of October 3.

Next, the access degree X(a, t) to the file a during the unit period t is multiplied by the grouping degree Y(t) during the same unit period, which is obtained in step 44, and a calibrated access degree W(a, t) is calculated. Then, this calibrated access degree is stored in a corresponding field in the calibrated access degree table 24 (FIG. 5) (S52). For example, the access degree X(1, 10/3) at the unit period of October 3 for the file "1 " is "0.27 " as described above, and the grouping degree Y(10/3) at the unit period of October 3 is "2.5" as described above. Therefore, the calibrated access degree W(1, 10/3) at the unit period of October 3 for the file "1" is equal to 0.68 (=0.27×2.5).

When the calibrated access degree W(a, t) for the file a during the unit period t is obtained, the processing returns to step 48 again, and determines whether or not all the unit periods have been selected with regard to the file a. Here, if all the unit periods have already been selected with regard to the file a, and the calibrated access degree W(a, t) with respect to each unit period has already been obtained as to the file a, the processing returns to step 45, and again, it is determined whether or not all the files have been selected. At this timing, if all the files have already been selected, and a calibrated access degree for each of all the unit periods has been obtained with respect to each file, the process of calculating the calibrated access degree (S40) is terminated.

Here, an explanation will be made regarding the access degree $X(a, t)$, the calibrated access degree $W(a, t)$, and the grouping degree $Y(t)$.

Basically, the access degree $X(a, t)$ of the file a is a relative value of the frequency to access to the file a during a particular unit period t, which is relative to the access frequency to the file a during all the unit periods within the accessed data acquisition period. Therefore, if the access degree $X(a, t)$ to the file a during the particular unit period t is high, it means that the access frequency to the file a during this particular unit period t is higher compared to the other unit periods. If another file b has a high access degree $X(b, t)$ during this particular unit period t, both access frequencies to the file a and the file b are higher during this unit period t, relative to the other unit periods. Therefore, it is possible to determine that there is a high similarity between the access frequency to the file a and the access frequency to the file b, and when grouping files having a high similarity in access frequency, both the file a and file b are treated as belonging to the same group. It is to be noted here that if the access frequency to other multiple files during this unit period t is also extremely high, both the file a and the file b are accessed because there is a high possibility that both files are accidentally accessed during this unit period t, not because there is a certain relationship between the file a and the file b.

In the present embodiment, if the total access frequency $N(t)$ to each file during a particular unit period t is high, the similarity between both files a and b is lowered. On the other hand, if the total access frequency to each file during the particular unit period t is low, a concept of grouping degree $Y(t)$ (=N/N(t)) is introduced so as to enhance the similarity between the files a and b, and by using the grouping degree, the similarity between the files a and b is corrected. In other words, as described above, if the total access frequency $N(t)$ to all the files during a particular unit period t becomes higher, the grouping degree $Y(t)$ conversely becomes lower. Therefore, in the present embodiment, the access degree $X(a, t)$ during a particular time is multiplied by the grouping degree $Y(t)$ as a weighting, and the obtained value is assumed as a calibrated access degree $W(a, t)$. The similarity of the access frequency with other files is considered, using this calibrated access degree $W(a, t)$, to eliminate, as much as possible, chance increasing of similarity.

Figure 8:
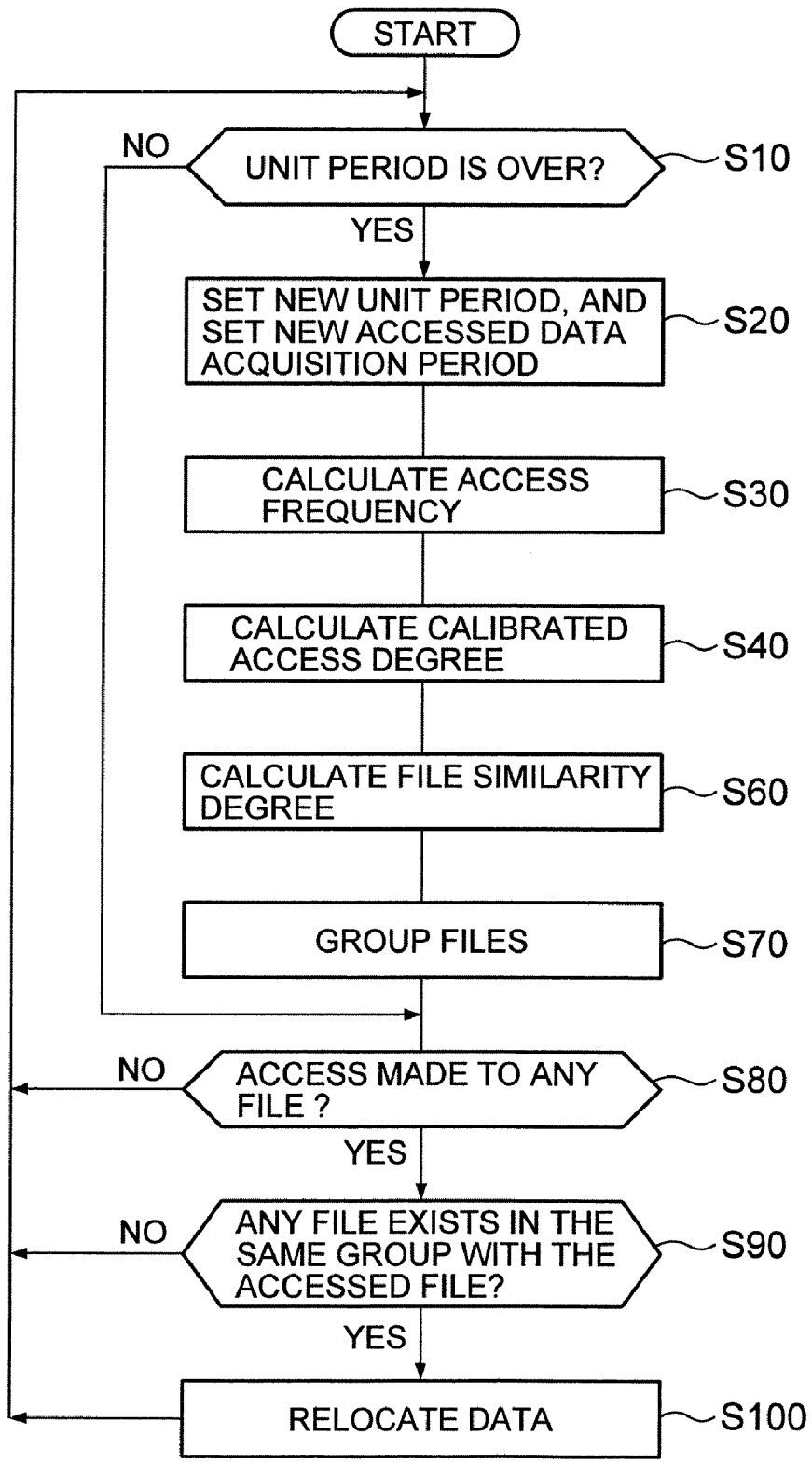
FIG. 8 is a flowchart showing an operation of a storage system as the first embodiment of the present invention.

When the process of calculating the calibrated access degree (S40) is terminated, as shown in the flowchart of FIG. 8, the file similarity degree calculation part 16 obtains a similarity degree of the access frequency between files (S60), by using the calibrated access degree obtained by the process of calculating the calibrated access degree (S40).

Figure 10:
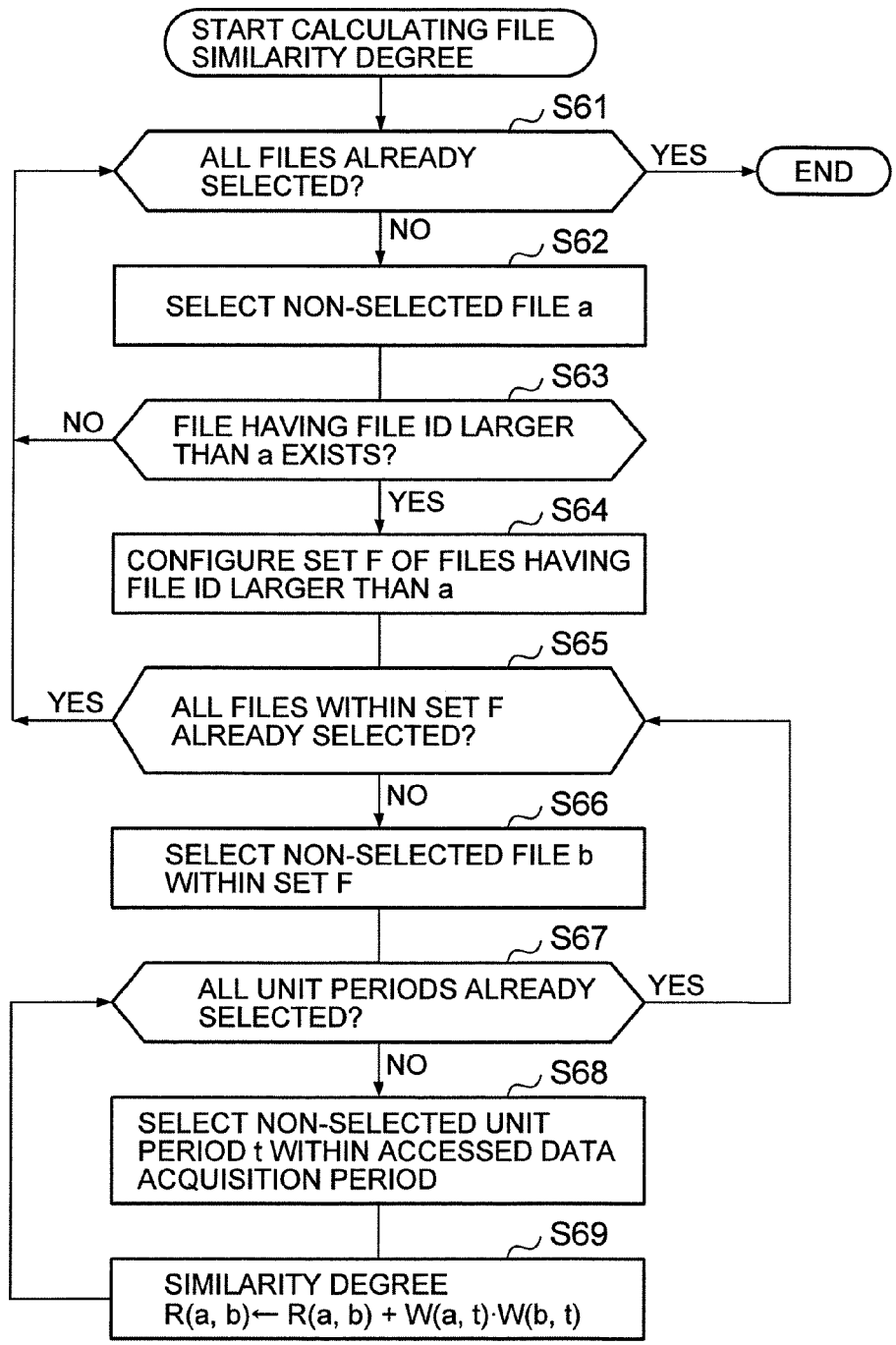
FIG. 10 is a flowchart showing details of the process for calculating the file similarity degree that is shown in FIG. 8.

As indicated by the flowchart in FIG. 10, in the process of calculating the file similarity degree (S60), firstly it is determined whether or not all the files stored in the calibrated access degree table 24 have been selected (S61). If all the files have already been selected, the process of calculating the file similarity degree (S60) is terminated. If all the files have not been selected, a file a that has not been selected yet is selected (S62).

Next, the file similarity degree calculation part 16 determines whether or not there exists in the calibrated access degree table 24, a file having an ID larger than the file ID of the file a (S63). If there is no file having a larger ID number, the processing returns to step 61. If there is a file having a larger ID number, all the larger IDs are extracted, and a set F of files having the larger IDs is formed (S64). Then, it is determined whether or not all the files within the set F have already been selected (S65). If all the files have already been selected, the process returns to S61. If all the files have not been selected yet, a non-selected file b within the set F is selected (S66).

When the file similarity degree calculation part 16 selects the non-selected file b within the set F, it is determined whether or not the entire unit periods within the accessed data acquisition period have been selected (S67). If all the unit periods have already been selected, the process returns to step 65, and if all the unit periods have not been selected yet, a non-selected unit period t within the accessed data acquisition period is selected (S68). Next, from the calibrated access degree table 24, the calibrated access degree $W(a, t)$ of the file a and the calibrated access degree $W(b, t)$ of the file b during this unit period t are extracted, and these are multiplied by each other, and an obtained value is set as a temporary similarity degree $R(a, b)$ (S69). When the temporary similarity degree is obtained, the process returns to step 67. In step 68, a non-selected unit period is selected, and the calibrated access degree of the file a and the calibrated access degree of the file b during this unit period are multiplied by each other, and to this obtained value, the temporary similarity degree $R(a, b)$ previously obtained is added (S69). Again, the process returns to step 67, and the step 67 to step 69 are repeated until selection of all the unit periods is completed. In other words, a value obtained by multiplying the calibrated access degree of the file a and the calibrated access degree of the file b with respect to each unit period within the accessed data acquisition period is summed, and an obtained total is set as a similarity degree $R(a, b)$ between the file a and the file b. This similarity degree $R(a, b)$ is stored in a corresponding field of the file similarity degree table 25 (FIG. 6). For example, the similarity degree $R(1, 2)$ between the file "1" and the file "2" in the calibrated access degree table 24 as shown in FIG. 5 is expressed as the following.

Similarity degree $R(1, 2)$=0×0.5 (for October 1)+0×1.25 (for October 2)+0.68×0.63 (for October 3)+0.91×0 (for October 4)+0.36×0 (for October 5)+0.18×0 (for October 6)+0×0 (for October 7)=0.43

This similarity degree $R(1, 2)$=0.43 is stored in the field of similarity degree of the file "2" being associated with the file "1", in the file similarity degree table 25 as shown in FIG. 6.

When the similarity $R(a, b)$ between the file a and file b is obtained, the process returns to step 65, and in step 66, a non-selected file c within the set F is selected. Then, a similarity degree $R(a, c)$ between the file a and the file c is obtained in the process from step 67 to step 69. If non-selected file does not exist any more in the set F (S65), the process returns to step 61. Finally, when the similarity degree is obtained with regard to all combinations of files as to all the files stored in the calibrated access degree table 24, this process of calculating the file similarity degree (S60) is terminated.

When the process of calculating the file similarity degree (S60) is terminated, as shown in the flowchart of FIG. 8, the grouping process part 17 puts more than one file into some groups (S70), by using the similarity degree obtained in the process of calculating the file similarity degree (S60). Here, in the file similarity degree table 25 (FIG. 6), two files having the similarity degree equal to 1 or more therebetween are determined as having a high access relevance ratio between the files, and they are treated as belonging to the same group. For example, the similarity degree between the file "1" and the file "3" is "1.15" according to the file similarity degree table 25. Therefore, both files are treated as being belonging to the same group and this result is stored in the file group table 26 (FIG. 7).

When the process of the grouping process (S70) as described above is terminated, the file relocation part 18 and the access processing part 19 determine whether or not there is access to any of the files (S80). If there is access to any of the files, the access processing part 19 performs the access processing for this file. In addition, the file relocation part 18 refers to the file group table 26, and determines whether or not there is a file belonging to the same group with this accessed file (S90). If there is a file belonging to the same group with this file and the files in the group are placed in the low-speed high-capacity storage unit 31, those files within the group are placed in the high-speed low-capacity storage unit 30. If those files within the group are already placed in the high-speed low-capacity storage unit 30, the location of the files is kept the same (S100). In the relocation process, if the file being accessed is placed in the low-speed high-capacity storage unit 31, this file may also be placed in the high-speed low-capacity storage unit 30.

When this data relocation process (S100) is terminated, and furthermore when a negative judgment is made in the previous judgments (S80, 90), the process returns to step 10, and steps 80, 90, 100, and 10 are repeated until the latest unit period is over.

In the present embodiment as described above, if there is access to a certain file and there is a second file that has a high access relevance with this file, this second file is placed in the high-speed storage unit 30 even through the access frequency to this second file is low, and therefore, accessing time can be reduced. In the present embodiment, an access frequency with respect to each file for each unit period within the accessed data acquisition period is obtained, and a similarity degree between the access frequency for every unit period of a certain file and the access frequency for every unit period of another file is obtained. Therefore, it is possible to perform grouping that does not depend much on chance. Also from this point of view, it is possible to say that accessing time can be reduced. For example, in the present embodiment, even though a second file is accessed after the particular file is accessed, the second file not being relevant to a particular file, it is possible to avoid this second file being treated as belonging to the same group. Even if there is a second file highly relevant to the particular file, and this second file is not accessed after the particular file is accessed, just before the placement of the file, it is possible to treat this second file as belonging to the same group. Especially, in the present embodiment, a concept of grouping degree $Y(t)$ is introduced and chance is eliminated as much as possible in the course of obtaining the similarity degree as an index of the grouping. Therefore, very relevant grouping can be performed.

In the description above, relocation of a file from the low-speed storage unit 31 to the high-speed storage unit 30 has been explained in detail. However, if only the relocation from the low-speed storage unit 31 to the high-speed storage unit 30 is performed, relocation of files in the high-speed storage unit 30 may become no longer possible at some future time. Therefore, it is required in the present embodiment that the relocation of a file from the high-speed storage unit 30 to the low-speed storage unit 31 be performed when a certain condition is satisfied. In order to implement the above processing, a method may be considered in which, for example, for a file having an access frequency equal to or less than a predetermined value, within the accessed data acquisition period, after the end of the file grouping process (S70) as shown in FIG. 8, the file is relocated to the low-speed storage unit 31, in the course of waiting for access to the file (S80).

Here, a load on the storage system relating to the relocation process as described above will be studied.

If the total number of files is assumed as N, and the number of unit periods included in the accessed data acquisition period is assumed as S, the number of arithmetical operations required for the processing is roughly calculated as follows.

In order to calculate $C(a)$, the number of access times is counted for each unit period. Therefore, it is necessary that the number of arithmetical operation times be S. Since $C(a, t)$ is divided by $C(a)$ in order to calculate $X(a, t)$, it is necessary that the number of arithmetical operation times be $(S+1)$. In order to calculate $X(a, t)$ of all the files for all the unit periods within the accessed data acquisition period, this calculation is performed for all the files and for all the unit periods. Therefore, it is necessary that the number of arithmetical operation times be $(S+1) \times S \times N$.

Since the information concerning whether a file is accessed or not is counted for each file, in order to calculate $N(t)$, it is necessary that the number of arithmetical operation times be N. Since $N(t)$ is divided by N in order to calculate $Y(t)$, it is necessary that the number of arithmetical operation times be $(N+1)$. In order to calculate $Y(t)$ for all the unit periods within the accessed data acquisition period, this calculation is performed for all the unit periods. Therefore, it is necessary that the number of arithmetical operation times be $(N+1) \times S$.

In order to calculate $W(a, t)$ of all the files for all the unit periods within the accessed data acquisition period, $X(a, t)$ is required to be divided by $Y(t)$ for all the files and for all the unit periods. Therefore, it is necessary that the number of arithmetical operation times be $(S+1) \times S \times N + (N+1) \times S + S \times N$.

In order to calculate $R(a, b)$ of combinations of all the files, multiplication and addition for all the unit periods are performed for $N \times (N-1)/2$ times, which is the number of combinations of all the files. Therefore, it is necessary that the number of arithmetical operation times be $(S+S) \times N \times (N-1)/2$.

In order to reduce the number of calculation times, the similarity degree may be calculated only for an accessed file after the file access is performed, as described in the following second embodiment, without calculating in advance the similarity degree of each combination of all the files. In this case, to calculate the similarity degree of the file being accessed, the multiplication and addition for all the unit periods are required to be performed for $(N-1)$ times, which is the number of files excluding the accessed file. Therefore, it is necessary that the number of arithmetical operation times be $(S+S) \times (N-1)$.

In the meantime, it is known that a Pentium (trademark)/2.8 GHz, which is a generally available CPU, has a computing performance of around 5.6 GFLOPS.

Here, it is assumed that by using a computer of 10 GFLOPS, the processing as described above is carried out under the condition that a total number of files is "one million", designated acquisition period is "one year", and an acquisition unit period is "one day". In this case, a rough calculation as follows can be done: According to the above description, the computing number of times required for obtaining $W(a, t)$ of all the files is equal to $134 \times 10^9$, and the time for computing is equal to 13.4 seconds. When the similarity degree of each combination of all the files is calculated in advance, the required number of computations is equal to $365067 \times 10^9$, and the time for computing is equal to 36506.7 seconds≈10 hours. When only the similarity degree is obtained as to an accessed file after the file accessing is performed, the required number of computations is equal to $0.73 \times 10^9$, and the time for computation is equal to 0.073 seconds.

According to the results as described above, the relocation method of the present embodiment is considered to be sufficiently feasible.

Second Embodiment

The second embodiment of the storage system according to the present invention will be explained with reference to FIG. 11 and FIG. 12.

The storage system according to the present embodiment has a functional configuration that is basically the same as the functional configuration of the first embodiment as shown in FIG. 1. However, the order of carrying out the processing in each of the functional configurations 12 to 19 is different from the first embodiment.

Figure 11:
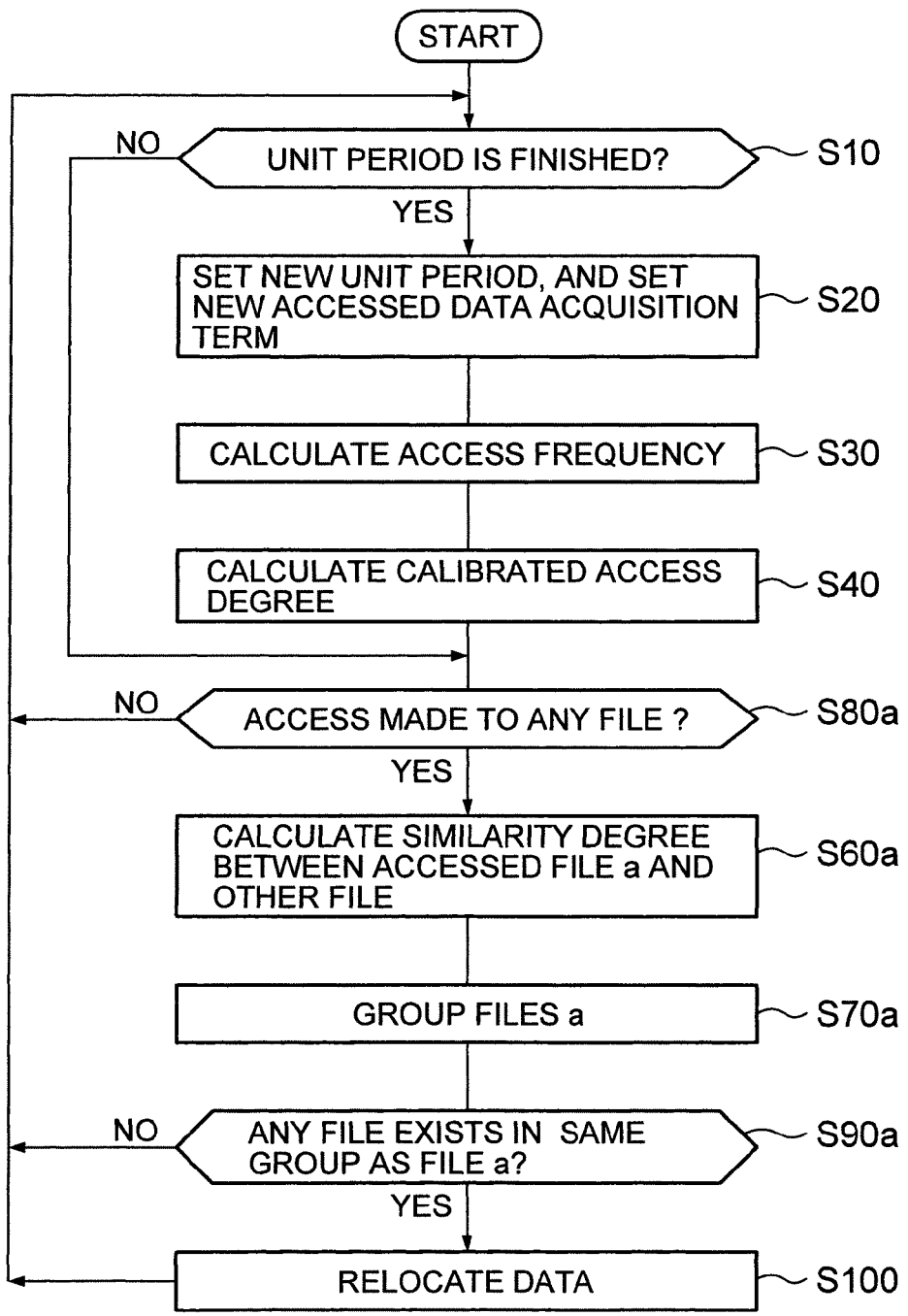
FIG. 11 is a flowchart showing an operation of the storage system as the second embodiment of the present invention.
Figure 12:
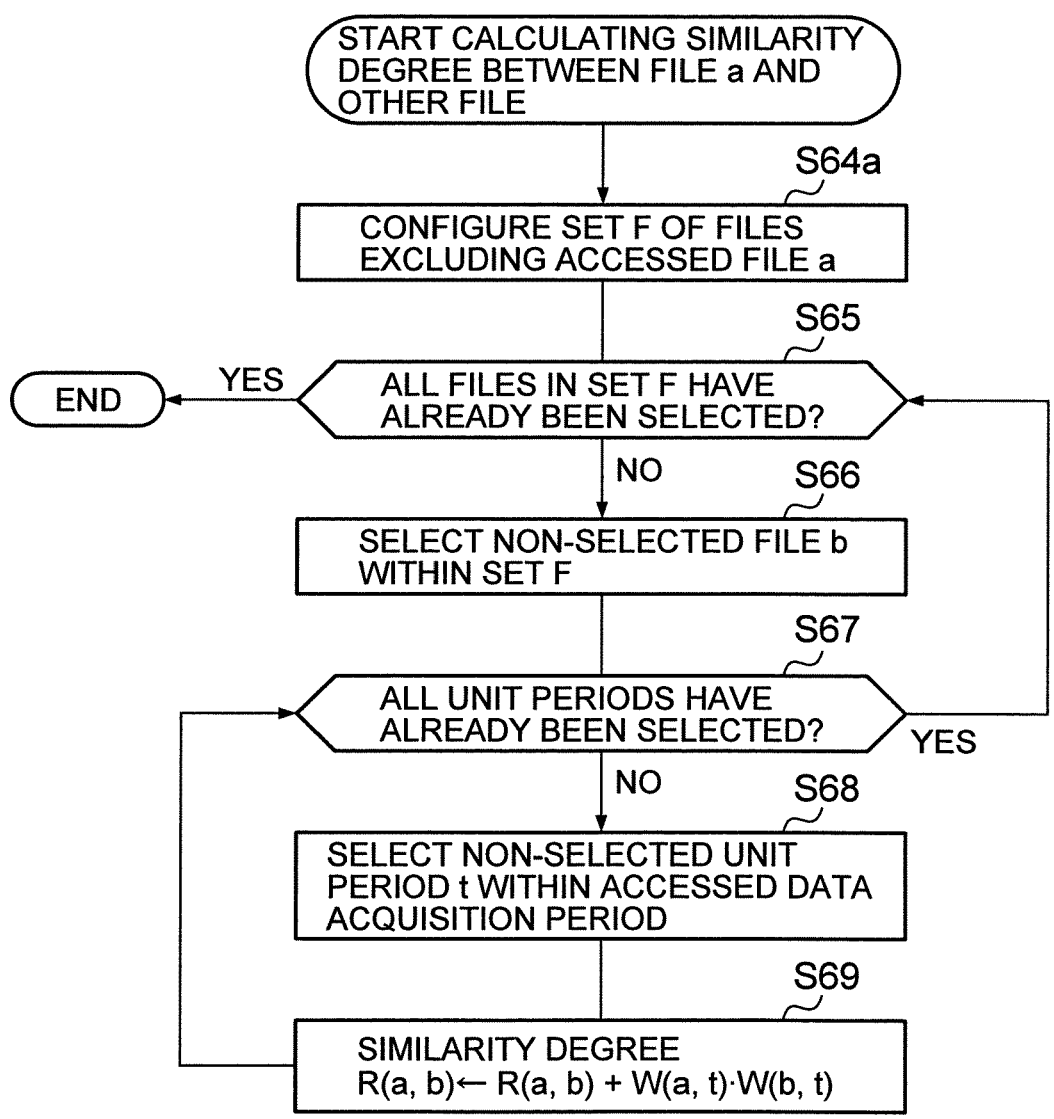
FIG. 12 is a flowchart showing details of the process for calculating the similarity degree as shown in FIG. 11.

Specifically as shown in FIG. 11, in the present embodiment, after any one of the files is accessed (S80a), a similarity degree between this accessed file a and another file is obtained (S60a). According to this similarity degree, a file belonging to the same group as this file a is determined (S70a). In other words, in the present embodiment, a process to determine the end of unit period (S10), a process to set a new accessed data acquisition period (S20), a process to calculate an access frequency (S30), and a process to calculate a calibrated access degree (S40) are the same as the first embodiment. However, in the present embodiment, at the point of time when the process to calculate the calibrated access degree (S40) is finished, a process to determine whether or not there is an access (S80a) is performed, and thereafter, as described above, a process to calculate a similarity degree between the access file a and a second file (S60a), and a process to group the file a (S70a) are performed. Then, a process to determine whether or not there is a file belonging to an identical group (S90a) and a process to relocate the data (S100) are performed.

The similarity degree calculation process (S60a) of the present embodiment does not need to obtain a similarity degree between each file and the other file for all the files. Therefore, as shown in the flowchart of FIG. 12, unlike the similarity degree calculating process (S60) of the first embodiment, a set F of the files excluding the accessed file a is configured immediately (S64a). Thereafter, each process from step 65 to step 69 is carried out, similar to the similarity degree calculation process (S60) of the first embodiment.

As thus described, unlike the first embodiment, in the present embodiment, the similarity degree calculating process (S60) and the grouping process (S70) are not carried out for all the files, and the similarity degree calculation process (S60a) and the grouping process (S70a) are carried out only for the file that has been accessed. Therefore, it is possible to reduce the load placed by the relocation process in the storage system.

Various Modifications

In the above examples, when a similarity degree between the files is obtained, an access degree and a calibrated access degree of this file are obtained according to the access frequency of the file, and by using this calibrated access degree, a similarity degree is obtained. However, there is another method that is capable of directly obtaining the similarity degree based on the access frequency, without acquiring the access degree and the calibrated access degree. By way of example, when a similarity degree between a file "1" and a file "2" is obtained, the access frequency of the file "1" and the access frequency of the file "2" are multiplied with respect to each unit period, and a value obtained by calculating the sum of those multiplied values may be assumed as the similarity degree between the file "1" and the file "2". In other words, the similarity degree R(1, 2) between the file "1" and the file "2" may be obtained as in the following.

Similarity degree R(1,2)=0×1 (for October 1)+0×2 (for October 2)+3×1 (for October 3)+5×0 (for October 4)+2×0 (for October 5)+1×0 (for October 6)+0×0 (for October 7)=3

In the case above, the file similarity degree table is as shown in FIG. 13. If it is assumed here that the files having a similarity degree of 15 or more between two files (underlined in the figure) have high access relevance between the files, and belong to the same group, a result of the grouping process may be the same as the first embodiment.

If the similarity degree is obtained as thus described, the calculation becomes extremely simple. Therefore, a load placed by the data relocation process in the storage system can be reduced. However, in this modified example, the concept of grouping degree to eliminate chance as much as possible is not utilized. Therefore, there may be more possibility of chance in the grouping, relative to the first embodiment.

However, there may be cases in which too large a number of files exist, which there have a high possibility of being accessed next after the file a is accessed, and relocation of those files to the high-speed memory 30 is difficult. There are some countermeasures to deal with the situation above, such as a method to change grouping threshold, a method to select from the upper rank of access relevance degree, by the number of files or by the total size of file, and a method to relocate only a write file that has a relatively long access time, out of two accessing types, reading and writing.

Among the above-mentioned methods, the method to relocate only the write file requires adding information as an access attribute indicating whether or not the access is for reading or writing, to the access date and time table 22 shown in FIG. 3. In addition, a field of access frequency of the access frequency table 23 is required to include a column to indicate whether the access is a read access or a write access. By way of example, when the file a receives an access (read or write), in order to relocate the file b having a high possibility of write access, the processing of S67, S68, and S69 as shown in FIG. 10 is executed by using the calibrated access degree W(a, t) of the file a and the calibrated write access degree Ww(b, t) of the file b, thereby obtaining the similarity degree between the file a and the file b. Here, the calibrated write access degree Ww(b, t) is defined as follows.

$$Ww(b, t) = Xw(b, t) \cdot Y(t) = [Cw(b, t)/C(b)] \cdot Y(t)$$

Xw(b, t): Write access degree during unit period t

Cw(b, t): Write access frequency to file b during unit period t

In other words, the calibrated write access degree Ww(b, t) of the file b is obtained by multiplying the write access degree Xw(b, t) to the file b, by the grouping degree Y(t) during the unit period t.

In the above example, relocation using the file as a unit has been explained. Besides the file unit, relocation may be performed for any data unit, as long as the data unit allows the acquisition of access frequency and transferring between storage units, such as mail, a folder, a volume, a table of database, a record, or a field.

In the above example, two types of storage units 30 and 31, high-speed access and low-speed access speed, are provided. However, the present invention is not limited to this configuration, and it is applicable to cases where three or more types of access speeds are available. For such cases, if there is a relationship between the file a and the file b, and the file a is accessed, it is possible to consider a method that relocates the file b to the highest speed storage unit. As an alternative method, for example, two thresholds are set as thresholds of similarity degree for grouping. A combination of files having a similarity degree equal to or more than the first threshold (>second threshold) is configured as belonging to a group of high relevancy. A combination of files having the similarity degree less than the first threshold and equal to or more than the second threshold is configured as belonging to a group of medium relevancy. When one file in the group of high relevancy is accessed, the file within this group may be placed in the highest speed storage unit . When one file in the group of medium relevancy is accessed, the file within this group may be placed in the storage unit having the second higher speed.

What is claimed is:

1. A data relocation method in a storage system provided with multiple storage units having different access speeds, the data relocation method comprising:
    a number of access to data item during a unit period acquiring process that divides a past constant accessed data acquisition period into multiple unit periods, and obtains a number of access to data item during the unit period for each data item stored in any of the multiple storage units;
    a similarity degree computing process that multiplies the number of accesses for each unit period of a particular data item, by the number of accesses during a corresponding unit period of an other data item, and sums a result of the multiplication for each unit period, as a similarity degree between the particular data item and the other data item, in order to show similarity of access tendency between data items during a past constant period;
    a grouping process that groups the particular data item and one or more other data items having the similarity degree equal to or higher than a predetermined grouping value, as a group of data items indicating a similar tendency of access;
    a data migrating process that, when the group of data items contains less items than a predetermined data items value, migrates one or more data items belonging to the group of data items into a storage unit having a high access speed among the multiple storage units, when at least one of data items belonging to the identical group and stored in a storage unit having a low access speed is accessed; and,
    a grouping value changing process that, when the group of data items contains items of at least the predetermined data items value, changes the predetermined number of data items value and implements the data relocation method again.

2. The data relocation method according to claim 1, wherein the grouping value changing process raises the predetermined data items value and implements the data relocation method again.

3. The data relocation method according to claim 1, the data relocation method further comprising:
    an access relevance degree ranking process of assigning an access relevance degree to each data item of the data items;
    wherein the data migrating process migrates data items of the one or more data items, beginning from an upper rank of access relevance degree of the data items.

4. The data relocation method according to claim 1, the data relocation method further comprising:
    a data item sizing process of determining a size of each data item of the data items;
    wherein the data migrating process migrates data items of the one or more data items, according to sizes of the data items.

5. The data relocation method according to claim 1, the data relocation method further comprising:
    an access-type determining process of determining whether an access of a data item is a read-type access or a write-type access;
    wherein the data migrating process migrates data items of the one or more data items, only for data items concerning the write-type access.

6. A non-transitory computer-readable recording medium that records a data relocation program of a storage system provided with multiple storage units having different access speeds, which allows a computer to execute:
    a number of access to data item during a unit period acquiring process that divides a past constant accessed data acquisition period into multiple unit periods, and obtains a number of access to data item during the unit period for each data item stored in any of the multiple storage units;
    a similarity degree computing process that multiplies the number of accesses for each unit period of a particular data item, by the number of accesses during a corresponding unit period of an other data item, and sums a result of the multiplication for each unit period, as a similarity degree between the particular data item and the other data item, in order to show similarity of access tendency between data items during a past constant period;
    a grouping process that groups the particular data item and one or more other data items having the similarity degree equal to or higher than a predetermined grouping value, as a group of data items indicating a similar tendency of access;
    a data migrating process that, when the group of data items contains less items than a predetermined data items value, migrates one or more data items belonging to the group of data items into a storage unit having a high access speed among the multiple storage units, when at least one of data items belonging to the identical group and stored in a storage unit having a low access speed is accessed; and,
    a grouping value changing process that, when the group of data items contains items of at least the predetermined data items value, changes the predetermined number of data items value and implements the data relocation program again.

7. The recording medium according to claim 6, wherein the grouping value changing process raises the predetermined data items value and implements the data relocation method again.

8. The recording medium according to claim 6, which allows the computer to further execute:
    an access relevance degree ranking process of assigning an access relevance degree to each data item of the data items;
    wherein the data migrating process migrates data items of the one or more data items, beginning from an upper rank of access relevance degree of the data items.

9. The recording medium according to claim 6, which allows the computer to further execute:
    a data item sizing process of determining a size of each data item of the data items;

wherein the data migrating process migrates data items of the one or more data items, according to sizes of the data items.

10. The recording medium according to claim 6, which allows the computer to further execute:
   an access-type determining process of determining whether an access of a data item is a read-type access or a write-type access;
   wherein the data migrating process migrates data items of the one or more data items, only for data items concerning the write-type access.

11. A storage system provided with multiple storage units each having a different access speed, where the storage system is effected at least in part by a processor and a memory, and is adapted to perform processes of:
   a number of access to data item during a unit period acquiring process that divides a past constant accessed data acquisition period into multiple unit periods, and obtains a number of access to data item during the unit period for each data item stored in any of the multiple storage units;
   a similarity degree computing process that multiplies the number of accesses for each unit period of a particular data item, by the number of accesses during a corresponding unit period of an other data item, and sums a result of the multiplication for each unit period, as a similarity degree between the particular data item and the other data item, in order to show similarity of access tendency between data items during a past constant period;
   a grouping process that groups the particular data item and one or more other data items having the similarity degree equal to or higher than a predetermined grouping value, as a group of data items indicating a similar tendency of access;
   a data migrating process that, when the group of data items contains less items than a predetermined data items value, migrates one or more data items belonging to the group of data items into a storage unit having a high access speed among the multiple storage units, when at least one of data items belonging to the identical group and stored in a storage unit having a low access speed is accessed; and,
   a grouping value changing process that, when the group of data items contains items of at least the predetermined data items value, changes the predetermined number of data items value and performs the processes again.

12. The storage system according to claim 11, wherein the grouping value changing process raises the predetermined data items value and implements the data relocation method again.

13. The storage system according to claim 11, adapted to perform further processes of:
   an access relevance degree ranking process of assigning an access relevance degree to each data item of the data items;
   wherein the data migrating process migrates data items of the one or more data items, beginning from an upper rank of access relevance degree of the data items.

14. The storage system according to claim 11, adapted to perform further processes of:
   a data item sizing process of determining a size of each data item of the data items;
   wherein the data migrating process migrates data items of the one or more data items, according to sizes of the data items.

15. The storage system according to claim 11, adapted to perform further processes of:
   an access-type determining process of determining whether an access of a data item is a read-type access or a write-type access;
   wherein the data migrating process migrates data items of the one or more data items, only for data items concerning the write-type access.

* * * * *